(12) United States Patent
Okimoto et al.

(10) Patent No.: US 12,174,084 B2
(45) Date of Patent: Dec. 24, 2024

(54) ANOMALY DETECTION SYSTEM AND ANOMALY DETECTION METHOD

(71) Applicant: THE JAPAN STEEL WORKS, LTD., Tokyo (JP)

(72) Inventors: Tasuku Okimoto, Tokyo (JP); Keita Hihara, Tokyo (JP); Yusuke Fukushi, Tokyo (JP); Hideki Tomiyama, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 624 days.

(21) Appl. No.: 17/425,891

(22) PCT Filed: Feb. 22, 2019

(86) PCT No.: PCT/JP2019/006703
§ 371 (c)(1),
(2) Date: Jul. 26, 2021

(87) PCT Pub. No.: WO2020/170409
PCT Pub. Date: Aug. 27, 2020

(65) Prior Publication Data
US 2022/0276126 A1    Sep. 1, 2022

(51) Int. Cl.
*G01M 13/028* (2019.01)
*F16H 57/01* (2012.01)

(52) U.S. Cl.
CPC .......... *G01M 13/028* (2013.01); *F16H 57/01* (2013.01); *F16H 2057/018* (2013.01)

(58) Field of Classification Search
CPC . G01M 13/028; F16H 57/01; F16H 2057/018
(Continued)

(56) References Cited

U.S. PATENT DOCUMENTS 6,560,552 B2 *  5/2003  Shen ..................... G01M 15/12
                                                              702/56
2015/0139504 A1  5/2015  Kurosawa et al.
(Continued)

FOREIGN PATENT DOCUMENTS

CN       105730450 A      7/2016
CN       107576488 A      1/2018
(Continued)

OTHER PUBLICATIONS

International Search Report from International Patent Application No. PCT/JP2019/006703, Apr. 23, 2019.
(Continued)

*Primary Examiner* — John E Breene
*Assistant Examiner* — Rose M Miller
(74) *Attorney, Agent, or Firm* — Potomac Law Group, PLLC (57) ABSTRACT

An anomaly detection system (1) according to an aspect of the present invention is an anomaly detection system (1) for detecting an anomaly in a reduction drive (10), the anomaly detection system (1) including: a sensor (11_1 to 11_3) attached to a housing of the reduction drive (10), the sensor (11_1 to 11_3) being configured to detect vibration on the surface of the housing of the reduction drive (10); a statistical analysis unit (12) configured to perform a statistical analysis on the vibration detected by the sensor (11_1 to 11_3); a frequency analysis unit (14) configured to perform a frequency analysis on the vibration detected by the sensor (11_1 to 11_3); and an anomaly determination unit (17) configured to perform anomaly determination on the reduction drive (10) based on a result of the statistical analysis and a result of the frequency analysis.

8 Claims, 9 Drawing Sheets

(58) Field of Classification Search
 USPC .......................................................... 73/660
 See application file for complete search history.

(56) References Cited

U.S. PATENT DOCUMENTS

| | | | |
|---|---|---|---|
| 2015/0165648 A1 | 6/2015 | Takamoto et al. | |
| 2017/0363072 A1* | 12/2017 | Son | G01M 7/00 |
| 2021/0041327 A1* | 2/2021 | Boston | G07C 3/06 |
| 2021/0123832 A1* | 4/2021 | Johnson | G01M 13/028 |

FOREIGN PATENT DOCUMENTS

| | | | | |
|---|---|---|---|---|
| CN | 108663988 A | | 10/2018 | |
| JP | S61-114134 A | | 5/1986 | |
| JP | 02088938 A | * | 3/1990 | .......... G01M 13/028 |
| JP | H07-182035 A | | 7/1995 | |
| JP | H09-049253 A | | 2/1997 | |
| JP | 2011-027452 A | | 2/2011 | |
| JP | 2012-008030 A | | 1/2012 | |
| JP | 2014-008677 A | | 1/2014 | |
| JP | 2018-091638 A | | 6/2018 | |
| JP | 2019-027788 A | | 2/2019 | |
| WO | WO-9004237 A1 | * | 4/1990 | |
| WO | WO-0150098 A1 | * | 7/2001 | ............. G01H 1/003 |

OTHER PUBLICATIONS

Office Action issued Oct. 11, 2022, in Japanese Patent Application No. 2021-501243.
Office Action issued Jul. 8, 2023, in Chinese Patent Application No. 201980092690.9.
Equipment Engineering, Version 1, Shanghai Equipment Management Association, East China University of Science and Technology Press, pp. 421-422, issued Aug. 31, 2005.
Office Action issued Jan. 3, 2024, in Chinese Patent Application No. 201980092690.9.
Office Action issued May 9, 2024, in Chinese Patent Application No. 201980092690.9.

* cited by examiner

ANOMALY DETECTION SYSTEM AND ANOMALY DETECTION METHOD

TECHNICAL FIELD

The present invention relates to an anomaly detection system and an anomaly detection method, and more particularly, to an anomaly detection system and an anomaly detection method for detecting an anomaly in a reduction drive used in an industrial machine.

BACKGROUND ART

Extruders are widely used as industrial machines for manufacturing plastic products. For example, a twin-screw extruder that mixes plastic raw materials using twin screws is known as one of the extruders (refer to Patent Literature 1).

CITATION LIST

Patent Literature

Patent Literature 1: Japanese Unexamined Patent Application Publication No. 2014-8677

SUMMARY OF INVENTION

Technical Problem

In the extruder, which is one of the industrial machines, a reduction drive that transmits power generated by a motor to each of the twin screws is used. The reduction drive converts the power generated by the motor into predetermined torque and transmits the torque to the twin screws. Various components such as a shaft, a bearing, and a gear are incorporated in the reduction drive. Since such various components are incorporated in the reduction drive, if a defect (the formation of a scratch or the like) occurs in some of the components, the defect in the components may lead to a failure of the entire reduction drive. Thus, an anomaly detection system capable of accurately detecting an anomaly in a reduction drive (component) is required.

In view of the above problem, it is an object of the present invention to provide an anomaly detection system and an anomaly detection method that are capable of accurately detecting an anomaly in a reduction drive.

Solution to Problem

An anomaly detection system according to an aspect of the present invention is an anomaly detection system for detecting an anomaly in a reduction drive, the anomaly detection system including: a sensor attached to a housing of the reduction drive, the sensor being configured to detect vibration on a surface of the housing of the reduction drive; a statistical analysis unit configured to perform a statistical analysis on the vibration detected by the sensor; a frequency analysis unit configured to perform a frequency analysis on the vibration detected by the sensor; and an anomaly determination unit configured to perform anomaly determination on the reduction drive based on a result of the statistical analysis and a result of the frequency analysis.

An anomaly detection method according to an aspect of the present invention is an anomaly detection method for detecting an anomaly in a reduction drive, the method including the steps of: performing a statistical analysis on vibration on a surface of a housing of the reduction drive using a sensor attached to the housing of the reduction drive; performing a frequency analysis on the vibration detected by the sensor; and performing anomaly determination on the reduction drive based on a result of the statistical analysis and a result of the frequency analysis.

Advantageous Effects of Invention

The present invention can provide an anomaly detection system and an anomaly detection method that are capable of accurately detecting an anomaly in a reduction drive.

DESCRIPTION OF EMBODIMENTS

Hereinbelow, an embodiment of the present invention will be described with reference to the drawings.

Figure 1:
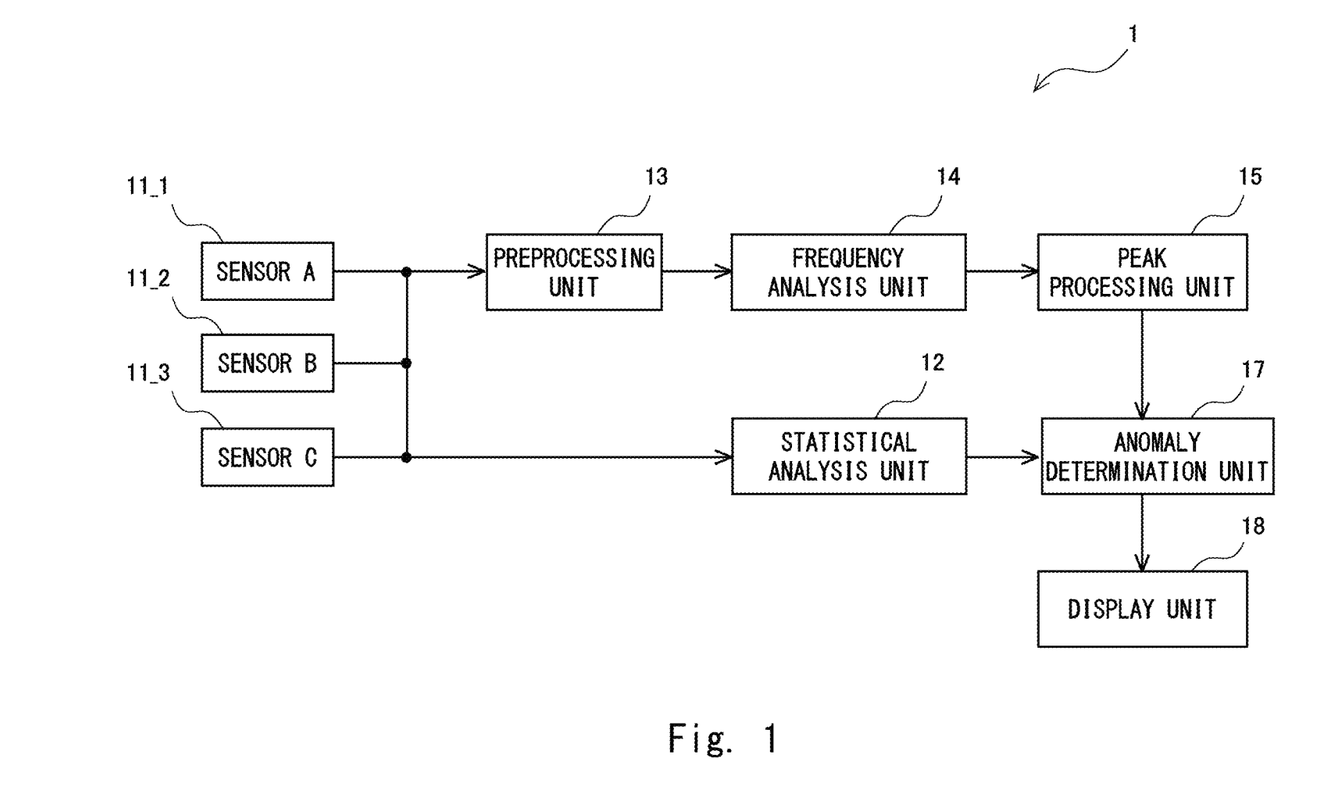
FIG. 1 is a block diagram for describing an anomaly detection system according to an embodiment.

FIG. 1 is a block diagram for describing an anomaly detection system according to the embodiment. An anomaly detection system 1 according to the present embodiment is typically an anomaly detection system for detecting an anomaly in a reduction drive used in an industrial machine such as an extruder (twin-screw extruder). As illustrated in FIG. 1, the anomaly detection system 1 according to the present embodiment includes sensors 11_1 to 11_3, a statistical analysis unit 12, a preprocessing unit 13, a frequency analysis unit 14, a peak processing unit 15, an anomaly determination unit 17, and a display unit 18. Note that although FIG. 1 illustrates an example in which the three sensors 11_1 to 11_3 are provided, the number of sensors may be any number equal to or larger than one.

Further, in the present specification, the sensors 11_1 to 11_3 may also be collectively referred to as the sensors 11.

Figure 2:
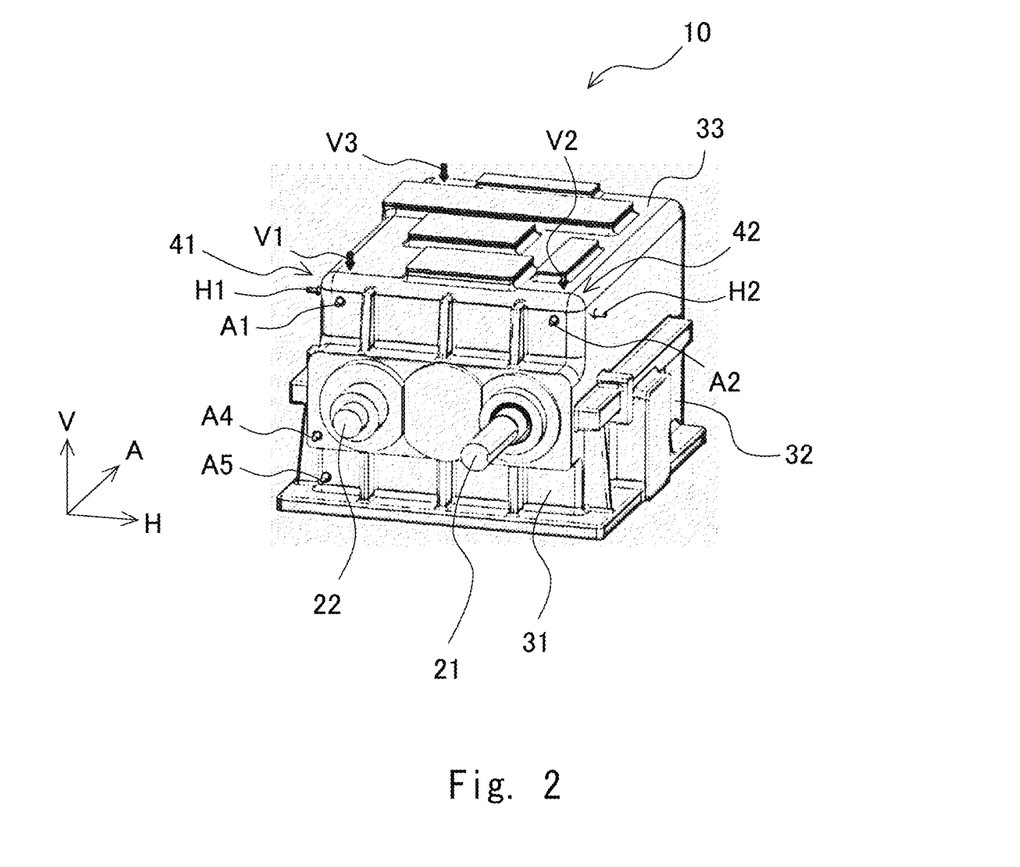
FIG. 2 is a perspective view for describing positions where sensors are attached.
Figure 3:
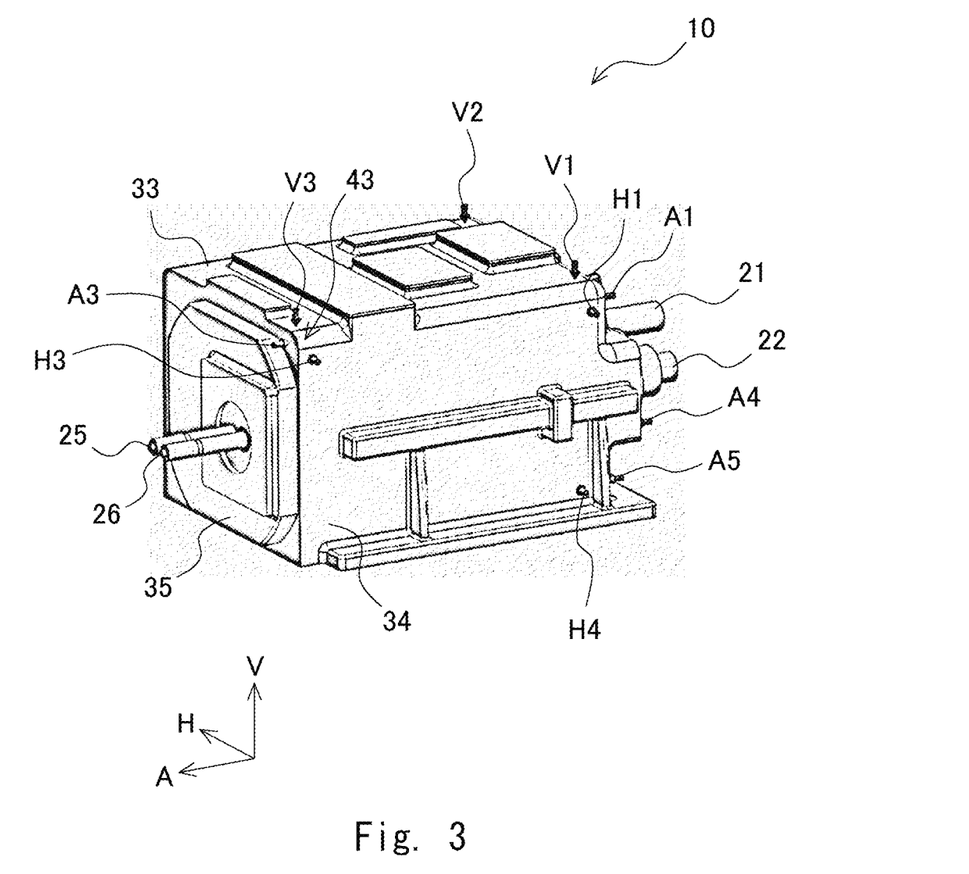
FIG. 3 is a perspective view for describing the positions where the sensors are attached.

The sensors 11 are attached to a housing of a reduction drive 10 to detect vibration on the surface of the housing of the reduction drive 10. FIGS. 2 and 3 are perspective views for describing positions where the sensors 11 are attached and illustrate an example of the positions on the reduction drive 10 where the sensors 11 are attached. Note that FIGS. 2 and 3 illustrate, as the sensors 11, sensors A1 to A5, H1 to H3, and V1 to V3, where A, H, and V indicate the direction of vibration detected by each of the sensors. For example, the sensor A1 detects vibration in an axis direction (A direction), the sensor H1 detects vibration in the horizontal direction (H direction), and the sensor V1 detects vibration in the vertical direction (V direction).

As illustrated in FIGS. 2 and 3, the housing (case) of the reduction drive 10 has a substantially box shape. As illustrated in FIG. 2, an input shaft 21 and a bearing 22 are disposed on a face 31 located at an input side of the reduction drive 10, that is, the face 31 located at the side to which power is input from a motor (not illustrated). As illustrated in FIG. 3, output shafts 25 and 26 are disposed on a face 35 located at an output side of the reduction drive 10, that is, the face 35 located at the side from which power is output to twin screws (not illustrated). Various components such as a shaft and a gear are provided inside the reduction drive 10. The reduction drive 10 converts power transmitted from the motor (not illustrated) to the input shaft 21 into predetermined torque and transmits the predetermined torque to the twin screws (not illustrated) through the output shafts 25 and 26.

As illustrated in FIGS. 2 and 3, each of the sensors is attached, near a corner of the housing of the reduction drive 10, onto the corresponding one of three faces defining the corner. Thus, the acceleration in the three-axis directions near the corner of the housing can be measured using each of the sensors.

Specifically, as illustrated in FIGS. 2 and 3, each of the sensors A1, H1, and V1 is provided near a corner 41 of the housing of the reduction drive 10. More specifically, the sensors A1, H1, and V1 are respectively attached onto the three faces 31, 34 (refer to FIG. 3), and 33 defining the corner 41. Near the corner 41, the sensor A1 detects vibration in the A-axis direction, the sensor H1 detects vibration in the H-axis direction, and the sensor V1 detects vibration in the V-axis direction.

Further, each of the sensors A2, H2, and V2 is provided near a corner 42 of the housing of the reduction drive 10. More specifically, the sensors A2, H2, and V2 are respectively attached onto the three faces 31, 32, and 33 defining the corner 42. Near the corner 42, the sensor A2 detects vibration in the A-axis direction, the sensor H2 detects vibration in the H-axis direction, and the sensor V2 detects vibration in the V-axis direction.

Further, each of the sensors A3, H3, and V3 (refer to FIG. 3) is provided near a corner 43 of the housing of the reduction drive 10. More specifically, the sensors A3, H3, and V3 are respectively attached onto the three faces 35, 34, and 33 defining the corner 43. Near the corner 43, the sensor A3 detects vibration in the A-axis direction, the sensor H3 detects vibration in the H-axis direction, and the sensor V3 detects vibration in the V-axis direction.

The sensor A4 (refer to FIG. 2) is provided near the bearing 22 of the reduction drive 10. Thus, vibration near the bearing 22 can be detected using the sensor A4. The sensor A5 (refer to FIG. 2) and the sensor H4 (refer to FIG. 3) are provided in a lower part of the reduction drive 10. Vibration in the lower part of the reduction drive 10 can be detected using the sensors A5 and H4. Thus, it is possible to obtain the difference between the vibration in the upper part of the reduction drive 10 and the vibration in the lower part thereof. In addition, the sensors A5 and H4 provided in the lower part of the reduction drive 10 can measure vibration of another machine that is set near the reduction drive 10 to be measured. This makes it possible to subtract vibration data of the other machine from vibration data of the reduction drive 10.

In the example illustrated in FIGS. 2 and 3, the sensors are attached to the upper side of the face 31 of the reduction drive 10 on which the input shaft 21 is provided and the upper side of the face 35 of the reduction drive 10 on which the output shafts 25 and 26 are provided. In other words, many sensors are attached around the corners 41, 42, and 43 on the upper side of the housing of the reduction drive 10. Vibration on the upper side of the housing of the reduction drive 10 is larger than vibration on the lower side thereof. Thus, large vibration data can be acquired by attaching many sensors to the upper side of the housing of the reduction drive 10.

The placement of the sensors described above is an example and can be appropriately changed according to the shape of the reduction drive 10 or the placement of the components. In determining the placement of the sensors, for example, a modal analysis is performed on the reduction drive 10 to estimate the natural frequency and the vibration shape of the reduction drive 10. Further, a hammering test is performed on the reduction drive 10 to experimentally obtain the natural frequency and the vibration shape, thereby verifying the accuracy of the modal analysis. The placement of the sensors can be determined by repeatedly performing the modal analysis and the hammering test. In addition, the placement of the sensors may be determined by identifying a vibration location or a resonance location in the reduction drive 10 by performing a vibration analysis simulating the operating state of the reduction drive 10.

The statistical analysis unit 12 illustrated in FIG. 1 performs a statistical analysis on vibration detected by each of the sensors 11_1 to 11_3. Specifically, the statistical analysis unit 12 performs the statistical analysis using the acceleration of the vibration detected by each of the sensors 11_1 to 11_3. Here, the statistical analysis is a method of statistical analysis using acceleration data of vibration, for example, a method for obtaining a frequency distribution of the magnitude of the acceleration of the vibration detected by each of the sensors 11_1 to 11_3. Details of the statistical analysis will be described later. Further, in the present embodiment, the statistical analysis may be performed using not the acceleration of vibration, but the speed or displacement of vibration. The same applies to a frequency analysis described below.

The preprocessing unit 13 performs preprocessing on the vibration data detected by each of the sensors 11_1 to 11_3. For example, processing for removing noise contained in the vibration data detected by each of the sensors 11_1 to 11_3 may be performed as the preprocessing. For example, the removal of noise can be performed using a filter such as a low-pass filter. Further, for example, enveloping may be performed as the preprocessing on the vibration data detected by each of the sensors 11_1 to 11_3.

The frequency analysis unit 14 performs a frequency analysis on the vibration detected by each of the sensors 11_1 to 11_3. Specifically, the frequency analysis unit 14 performs the frequency analysis on the vibration data from which noise has been removed by the preprocessing unit 13. For example, the frequency analysis unit 14 generates a power spectrum indicating the magnitude of the acceleration relative to the frequency of the vibration detected by each of the sensors 11_1 to 11_3. Fast Fourier transform (FFT) can be used in the frequency analysis. Details of the frequency analysis will be described later.

The peak processing unit 15 performs processing for making the power spectrum generated by the frequency analysis unit 14 clear, that is, processing for enhancing a peak. For example, the peak processing unit 15 can enhance the peak by adding the frequency-analyzed data (power spectrum) a predetermined number of times and then performing processing for dividing the added value by a predetermined value (averaging).

The anomaly determination unit 17 performs anomaly determination on the reduction drive 10 on the basis of an analysis result of the statistical analysis unit 12 and an analysis result of the frequency analysis unit 14 (output of the peak processing unit 15). Specifically, the anomaly determination unit 17 determines the presence or absence of an anomaly in the reduction drive 10 on the basis of a result of the statistical analysis in the statistical analysis unit 12. For example, the anomaly determination unit 17 can determine the presence or absence of an anomaly in the reduction drive 10 on the basis of the frequency distribution of the magnitude of the acceleration of the vibration detected by each of the sensors 11_1 to 11_3.

Further, the anomaly determination unit 17 can identify the type of the anomaly in the reduction drive 10 on the basis of the power spectrum generated by the frequency analysis unit 14. The type of the anomaly in the reduction drive 10 is a defect in each component and, for example, a scratch, a crack, wear, or corrosion in the shaft, the bearing, or the gear. The type of the anomaly in the reduction drive 10 may be an anomaly in oil.

For example, anomaly determination data associating the power spectrum indicating an anomaly with the type of an anomaly in the reduction drive 10 may be previously stored in the anomaly determination unit 17. The anomaly determination unit 17 can identify the type of the anomaly in the reduction drive 10 by checking the power spectrum generated by the frequency analysis unit 14 against the anomaly determination data previously stored. For example, a database of power spectra corresponding to the types of anomalies in the reduction drive 10 (types of anomalies in the components), such as a power spectrum in a case where the bearing has a scratch and a power spectrum in a case where the gear has a scratch, is previously created in the anomaly determination unit 17. The type of the anomaly in the reduction drive 10 can be identified by checking the power spectrum generated by the frequency analysis unit 14 against the database.

The sensors 11_1 to 11_3 are attached onto the surface of the housing of the reduction drive 10 at a plurality of locations (refer to FIGS. 2 and 3). The anomaly determination unit 17 may identify the anomaly location in the reduction drive 10 on the basis of results of the statistical analysis and results of the frequency analysis on the plurality of sensors 11_1 to 11_3. For example, when vibration detected by the sensor 11_3 is larger than a reference value, it can be determined that the anomaly location is near the sensor 11_3.

The display unit 18 illustrated in FIG. 1 displays a determination result in the anomaly determination unit 17. For example, the display unit 18 includes a liquid crystal display. A user can grasp the state of the reduction drive 10, that is, the presence or absence of an anomaly, the type of the anomaly, and the anomaly location by checking a message displayed on the display unit 18. A check recommending message may be displayed on the display unit 18. Further, a screen for requesting maintenance may be displayed on the display unit 18. For example, a user can easily request a manufacturer to perform maintenance by touching a maintenance request button displayed on the display unit 18 (touch panel). Further, a screen for ordering a component to replace a defective component may be displayed on the display unit 18. For example, a user can order a component to replace a defective component by touching an order button displayed on the display unit 18 (touch panel).

Next, an operation of the anomaly detection system according to the present embodiment will be described with reference to a flowchart illustrated in FIG. 4. Hereinbelow, the operation of the anomaly detection system will be described with reference to a concrete example.

Figure 5:
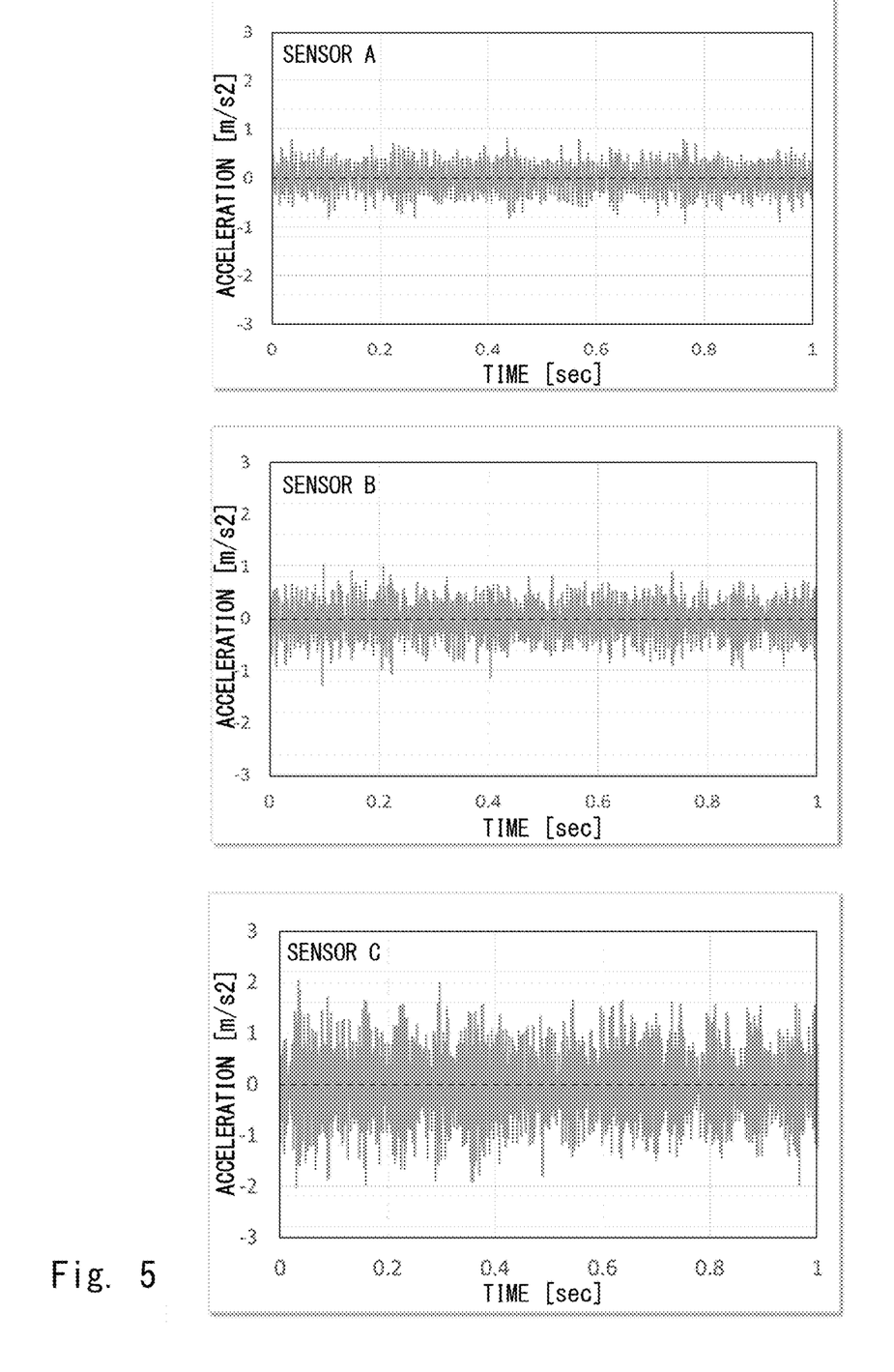
FIG. 5 is graphs illustrating vibration waveforms detected by the sensors.

First, the reduction drive 10 is operated in a steady state (step S1). Next, vibration data on the surface of the housing of the reduction drive 10 operating in a steady state is acquired using the sensors 11_1 to 11_3 attached to the reduction drive 10 (step S2). FIG. 5 is graphs illustrating vibration waveforms detected by the sensors 11_1 to 11_3. Note that, in the following description, the sensors 11_1 to 11_3 are also referred to as sensors A to C.

As illustrated in FIG. 5, the vibration data of each of the sensors A to C is waveform data with the horizontal axis representing time and the vertical axis representing acceleration. That is, the vibration data illustrated in FIG. 5 shows changes over time of the acceleration of vibration on the surface of the housing of the reduction drive 10. The vibration data illustrated in FIG. 5 shows that the amplitude of vibration on the surface of the housing increases as the acceleration increases. In the example illustrated in FIG. 5, of the waveforms of the sensors A to C, the vibration data of the sensor C has the largest acceleration, which shows that the amplitude of vibration is large at the position where the sensor C is attached.

Figure 6:
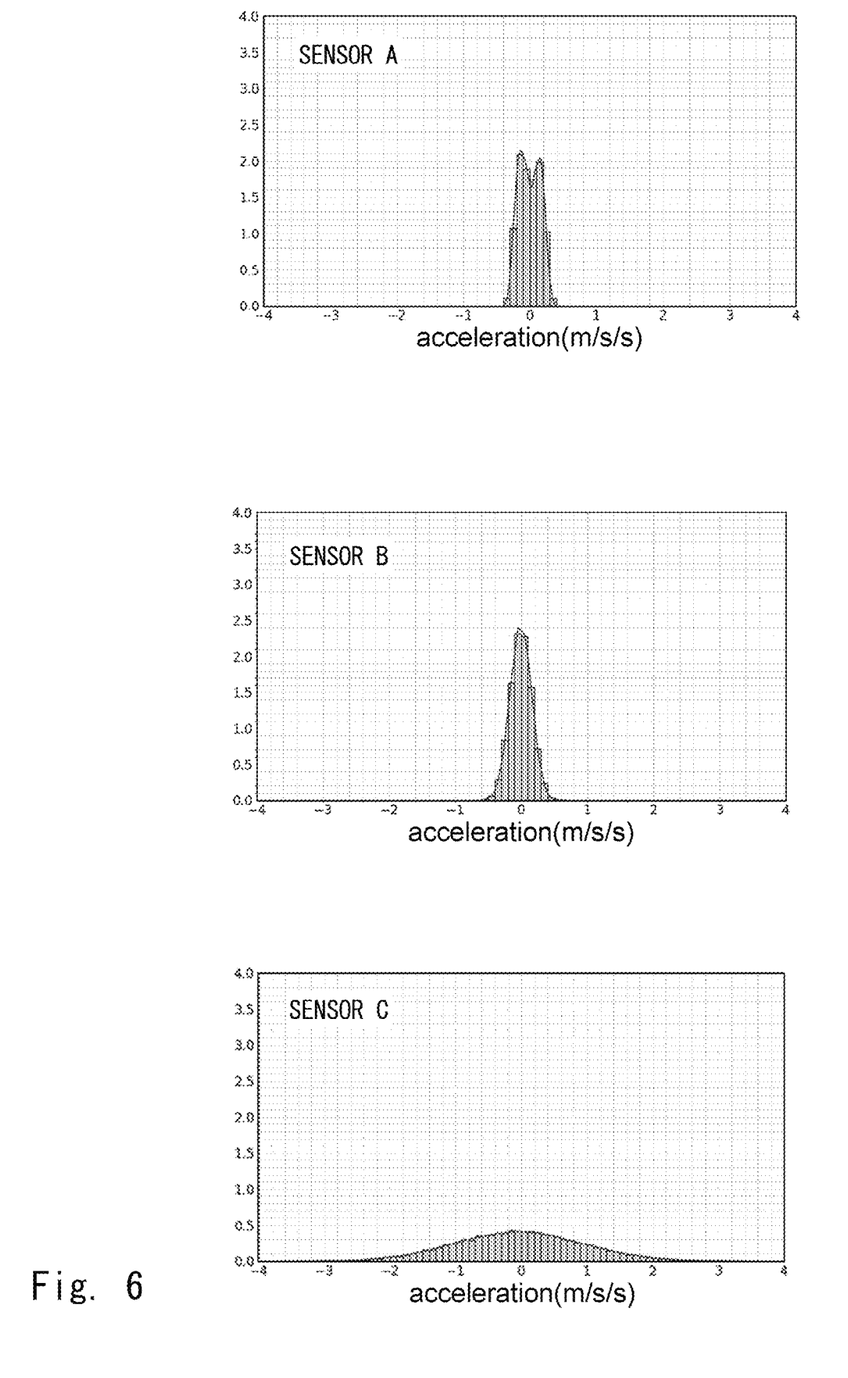
FIG. 6 is graphs for describing an example of statistical processing performed using acceleration of vibration detected by each of the sensors.

Next, the statistical analysis unit 12 performs a statistical analysis using the acceleration of the vibration detected by each of the sensors A to C (step S3). FIG. 6 is graphs for describing an example of statistical processing performed using the acceleration of the vibration detected by each of the sensors A to C. The graphs illustrated in FIG. 6 show an example in which the frequency distribution of the magnitude of the acceleration of the vibration detected by each of the sensors A to C is obtained. Each of the graphs illustrated in FIG. 6 is a histogram and has the horizontal axis representing a section (class) of acceleration and the vertical axis representing frequency in each section (class).

In the graphs illustrated in FIG. 6, the range of each section of acceleration is 0.1. The acceleration of the vibration data of each of the sensors A and B illustrated in FIG. 5 is within the range of ±1. Thus, in the graphs of the sensors A and B illustrated in FIG. 6, the shape of the frequency distribution is sharp. On the other hand, the acceleration of the vibration data of the sensor C illustrated in FIG. 5 is within the range of ±2. Thus, in the graph of the sensor C illustrated in FIG. 6, the shape of the frequency distribution is broad. The statistical analysis unit 12 obtains, from a result illustrated in FIG. 6, a variance as a result of the statistical analysis on the vibration data of each of the sensors A to C. In the example illustrated in FIG. 6, since the shape of the frequency distribution is sharp in the graphs of the sensors A and B, the variance thereof is small. On the other hand, since the shape of the frequency distribution is broad in the graph of the sensor C, the variance thereof is large.

Further, the preprocessing unit 13 performs preprocessing on the vibration data detected by each of the sensors A to C (step S4). For example, the preprocessing unit 13 performs processing for removing noise contained in the vibration data detected by each of the sensors A to C using a low-pass filter.

Next, the frequency analysis unit 14 performs a frequency analysis on the vibration data from which noise has been removed by the preprocessing unit 13 (step S5). Specifically, the frequency analysis unit 14 generates a power spectrum indicating the magnitude of the acceleration relative to the frequency of the vibration detected by each of the sensors A to C. Fast Fourier transform (FFT) can be used in the frequency analysis.

Then, the peak processing unit 15 performs peak processing for making the power spectrum generated by the frequency analysis unit 14 clear (step S6).

Figure 7:
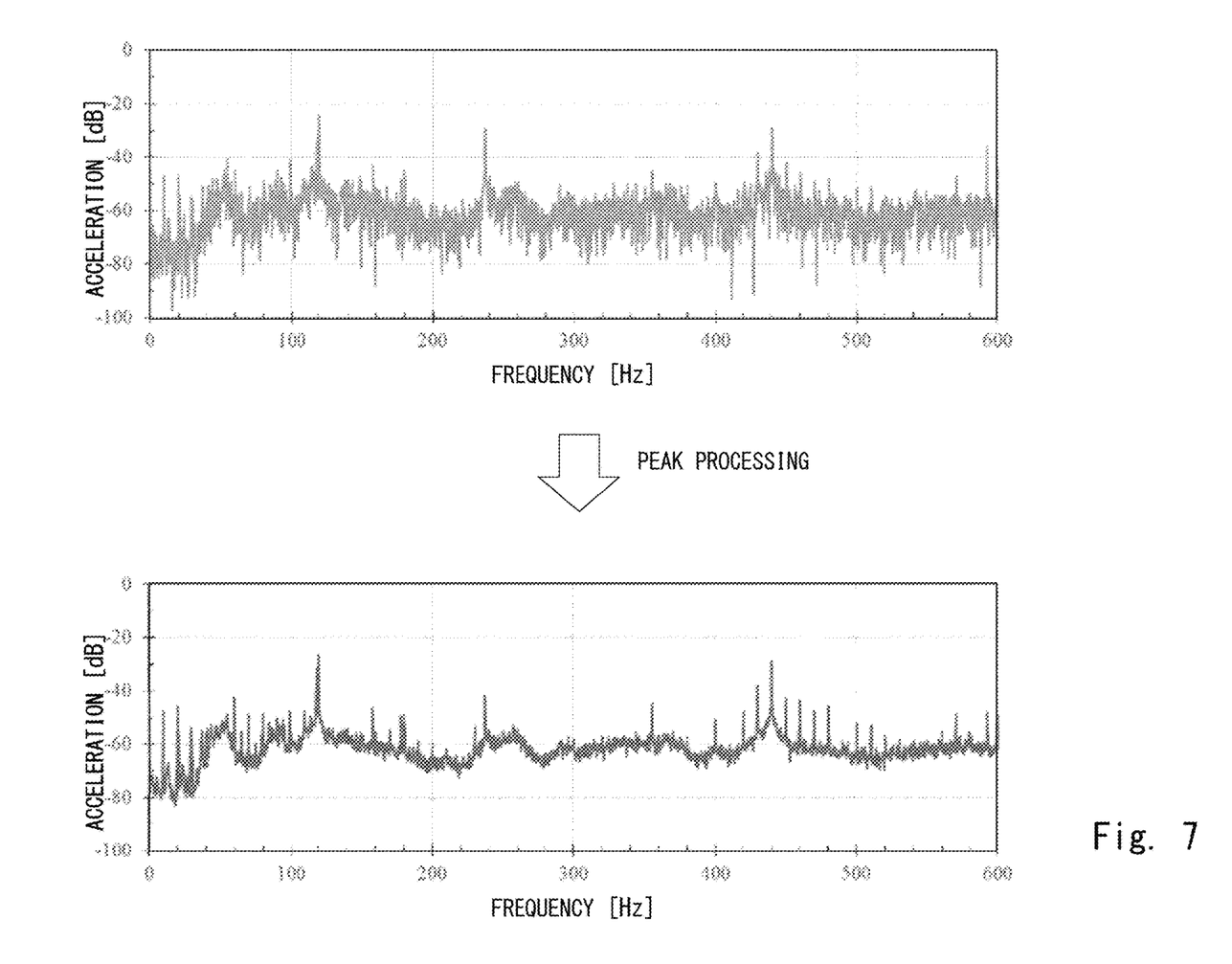
FIG. 7 is graphs for describing an example of a frequency analysis performed on the vibration detected by the sensor.

FIG. 7 is graphs for describing an example of the frequency analysis performed on the vibration detected by the sensor. The upper graph of FIG. 7 shows the power spectrum generated by the frequency analysis unit 14. The lower graph of FIG. 7 shows the power spectrum peak-processed by the peak processing unit 15. Note that FIG. 7 shows the power spectrum of the sensor C as a representative example.

The frequency analysis unit 14 performs Fast Fourier transform (FFT) processing on the vibration data on which the preprocessing has been performed (from which noise has been removed) to generate the power spectrum indicating the magnitude of the acceleration relative to the frequency as illustrated in the upper graph of FIG. 7. Further, the peak processing unit 15 adds the frequency-analyzed data (power spectrum) a predetermined number of times and then performs processing for dividing the added value by a predetermined value (averaging). This enables the peak to be enhanced as illustrated in the lower graph of FIG. 7.

Next, the anomaly determination unit 17 performs anomaly determination on the reduction drive 10 on the basis of a result of the statistical analysis (step S3) and a result of the frequency analysis (steps S4 to S6) (step S7). Specifically, the anomaly determination unit 17 determines the presence or absence of an anomaly in the reduction drive 10 on the basis of the frequency distribution of the vibration data of each of the sensors A to C (refer to FIG. 6).

Figure 8:
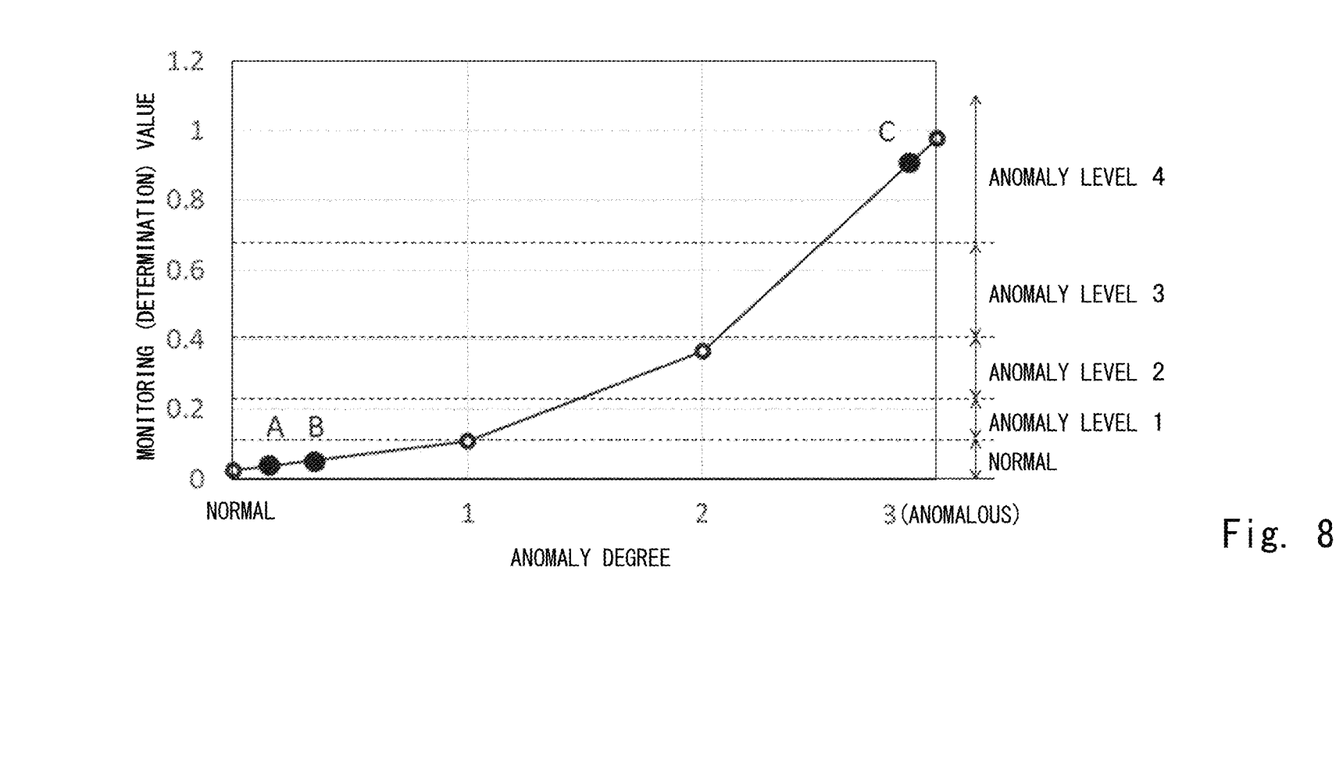
FIG. 8 is a graph for describing anomaly determination.

FIG. 8 is a graph for describing the anomaly determination. The horizontal axis of FIG. 8 represents an anomaly degree, and the vertical axis of FIG. 8 represents a monitoring (determination) value. The monitoring (determination) value corresponds to the variance obtained from the frequency distribution illustrated in FIG. 6. That is, FIG. 8 shows that the anomaly degree increases as the variance increases. Specifically, in FIG. 6, since the shape of the frequency distribution is sharp in the graphs of the sensors A and B, the variance thereof is small. Thus, in the graph illustrated in FIG. 8, since the variance of each of the sensors A and B is small, the vibration data of each of the sensors A and B is determined to be normal. On the other hand, in FIG. 6, since the shape of the frequency distribution is broad in the graph of the sensor C, the variance thereof is large. Thus, in the graph illustrated in FIG. 8, since the variance of the sensor C is large, the vibration data of the sensor C is determined to be anomalous (anomaly level 4).

Further, in the graph of FIG. 8, anomaly levels 1 to 4 are set on the basis of the variance of the frequency distribution serving as the monitoring (determination) value. The graph illustrated in FIG. 8 shows that the anomaly degree increases as the anomaly level increases.

For example, a pre-scratched component is used to constitute the reduction drive 10, and the variance of the frequency distribution is obtained using vibration data of the reduction drive 10. Consequently, the graph as illustrated in FIG. 8 can be created. Specifically, a component having a "small" scratch, a component having a "medium" scratch, and a component having a "large" scratch are used to constitute reduction drives 10. Then, vibration data of each of the reduction drives 10 configured in this manner is acquired, and the variance of the frequency distribution of the acceleration of each of the reduction drives 10 is obtained.

That is, the anomaly degree on the horizontal axis of FIG. 8 corresponds to the size (small, medium, or large) of the scratch on the pre-scratched component. The size of the scratch increases as the anomaly degree increases. Thus, in the graph illustrated in FIG. 8, the variance (monitoring (determination) value) of the frequency distribution of the acceleration increases as the anomaly degree increases. The anomaly determination unit 17 can accurately determine the presence or absence of an anomaly in the reduction drive 10 by using the graph (determination criteria) previously created as illustrated in FIG. 8.

Further, the anomaly determination unit 17 can identify the type of the anomaly in the reduction drive 10 on the basis of the power spectrum, which is the result of the frequency analysis (steps S4 to S6). The type of the anomaly in the reduction drive 10 is a defect in each component and, for example, a scratch, a crack, wear, or corrosion in the shaft, the bearing, or the gear. The type of the anomaly in the reduction drive 10 may be an anomaly in oil.

Figure 9:
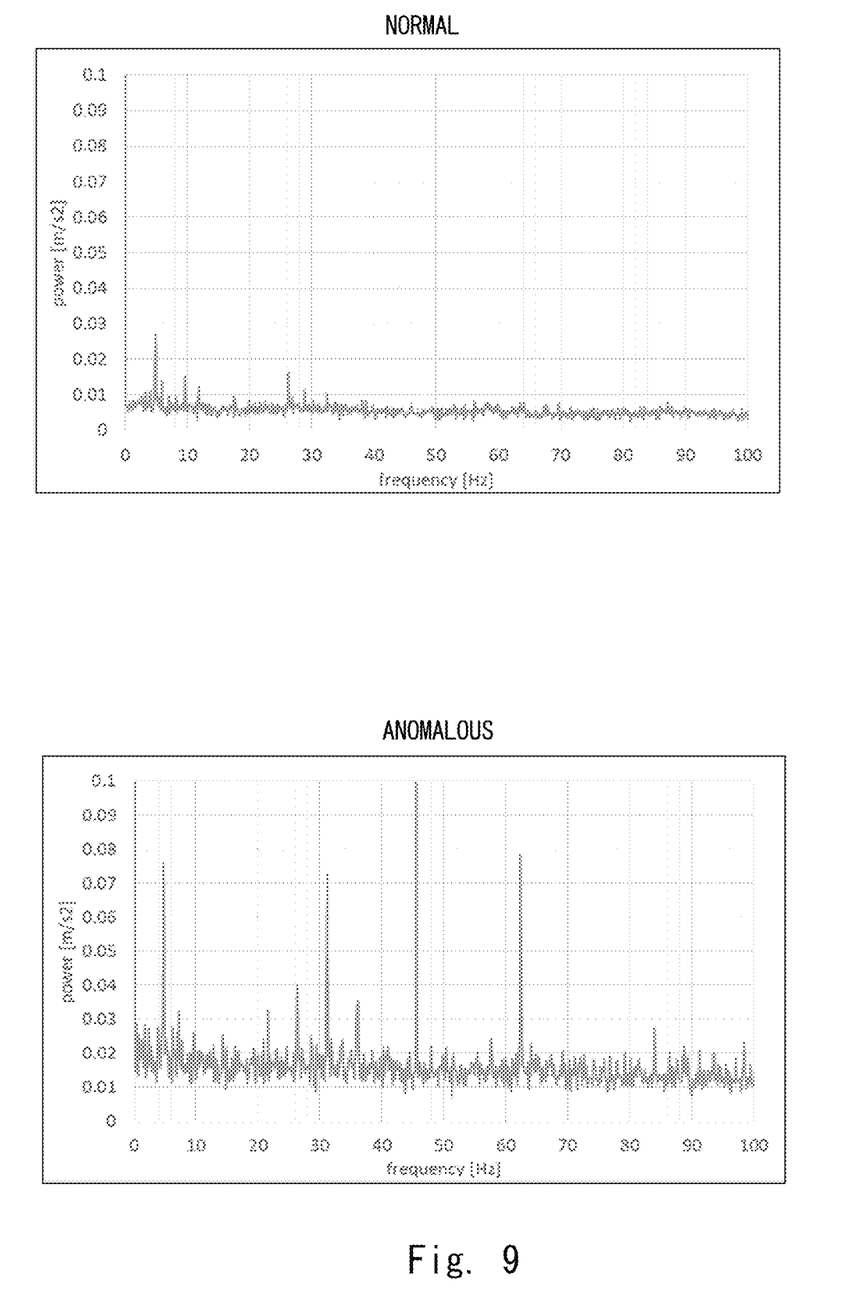
FIG. 9 is graphs for describing an example of a power spectrum obtained through the frequency analysis.

FIG. 9 is graphs for describing an example of the power spectrum obtained through the frequency analysis and illustrates the power spectrum in a normal condition (the upper graph of FIG. 9) and the power spectrum in an anomalous condition (the lower graph of FIG. 9). As illustrated in FIG. 9, a power value in the power spectrum in the anomalous condition (the lower graph of FIG. 9) is higher than that in the power spectrum in the normal condition (the upper graph of FIG. 9). In particular, in the power spectrum in the anomalous condition (the lower graph of FIG. 9), the power value is high at a specific frequency. In the example illustrated in the lower graph of FIG. 9, the power value is particularly high around a frequency of 30 Hz. The anomaly determination unit 17 can identify the type of the anomaly (may be the anomaly location, the same applies to the following description) in the reduction drive 10 by using the specific frequency at which the power value is high.

For example, the anomaly determination data associating the power spectrum indicating an anomaly with the type of an anomaly (may be the anomaly location) in the reduction drive 10 may be previously stored in the anomaly determination unit 17. That is, the database of power spectra corresponding to the types of anomalies in the reduction drive 10 (types of anomalies in the components), such as a power spectrum in a case where the bearing has a scratch and a power spectrum in a case where the gear has a scratch, is previously created in the anomaly determination unit 17. Further, a table associating the type of an anomaly in the reduction drive 10 with a frequency at which the power value is high in the anomaly may be stored in the anomaly determination unit 17.

The anomaly determination unit 17 can identify the type of the anomaly in the reduction drive 10 by checking the power spectrum generated by the frequency analysis unit 14 against the anomaly determination data previously stored.

Specifically, a specific frequency at which the power value is high is checked against the anomaly determination data. Consequently, the type of an anomaly corresponding to the specific frequency can be identified.

Figure 4:
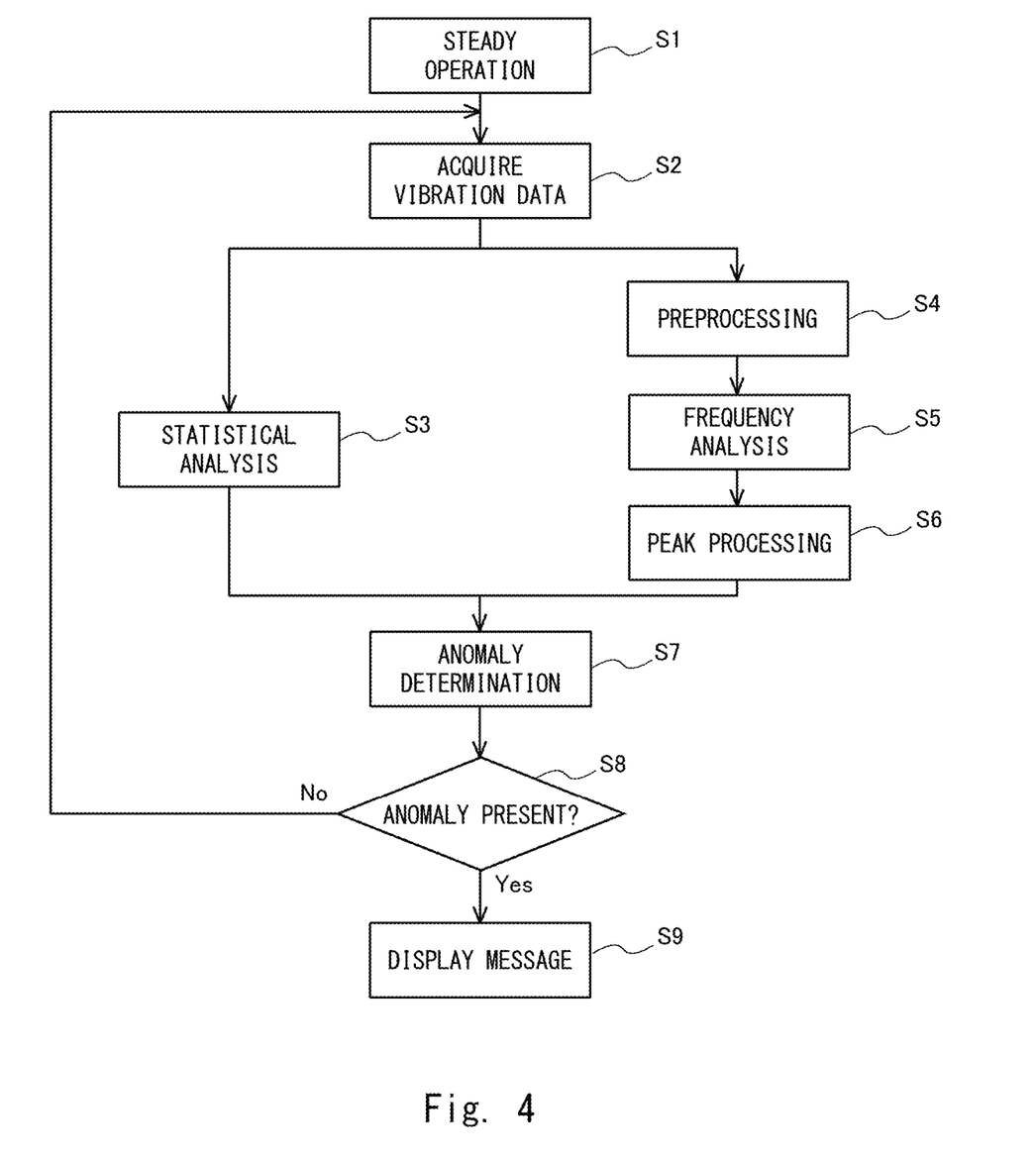
FIG. 4 is a flowchart for describing an operation of the anomaly detection system according to the embodiment.

As illustrated in the flowchart of FIG. 4, when the anomaly determination unit 17 determines that no anomaly is present (step S8: No), operations of steps S2 to S8 are repeated again. On the other hand, when the anomaly determination unit 17 determines that an anomaly is present (step S8: Yes), a message indicating that the reduction drive 10 is anomalous is displayed on the display unit 18.

Note that the statistical analysis (step S3) and the frequency analysis (steps S4 to S6) described above may be performed in any order or may be simultaneously performed.

As described above, in the present embodiment, vibration on the surface of the housing of the reduction drive is detected using the sensor attached to the housing of the reduction drive. Then, the statistical analysis and the frequency analysis are performed on the vibration detected by the sensor, and the anomaly determination is performed on the reduction drive on the basis of results of these analyses. Thus, it is possible to provide the anomaly detection system and the anomaly detection method that are capable of accurately detecting an anomaly in the reduction drive.

That is, in the anomaly detection system according to the present embodiment, the presence or absence of an anomaly in the reduction drive 10 can be determined on the basis of the result of the statistical analysis in the statistical analysis unit 12. Further, the type of the anomaly in the reduction drive 10 can be identified on the basis of the power spectrum generated by the frequency analysis unit 14. Furthermore, the anomaly location in the reduction drive 10 can be identified on the basis of results of the statistical analysis and results of the frequency analysis on the plurality of sensors 11. Since the anomaly detection system according to the present embodiment performs the anomaly determination on the reduction drive using the statistical analysis result and the frequency analysis result, it is possible to accurately detect an anomaly (the presence or absence of an anomaly, the type of the anomaly, and the anomaly location) in the reduction drive.

The present invention has been described with reference to the embodiment. However, the present invention is not limited only to the above embodiment. It is needless to say that the present invention includes various modifications, corrections, and combinations that can be made by those skilled in the art within the range of the claims.

REFERENCE SIGNS LIST

1 ANOMALY DETECTION SYSTEM
10 REDUCTION DRIVE
11_1, 11_2, 11_3 SENSOR
12 STATISTICAL ANALYSIS UNIT
13 PREPROCESSING UNIT
14 FREQUENCY ANALYSIS UNIT
15 PEAK PROCESSING UNIT
17 ANOMALY DETERMINATION UNIT
18 DISPLAY UNIT
21 INPUT SHAFT
22 BEARING
25, 26 OUTPUT SHAFT

The invention claimed is:

1. An anomaly detection system for detecting an anomaly in a reduction drive, the anomaly detection system comprising:
a sensor attached to a housing of the reduction drive, the sensor being configured to detect vibration on a surface of the housing of the reduction drive;
a statistical analysis unit configured to perform a statistical analysis on the vibration detected by the sensor;
a frequency analysis unit configured to perform a frequency analysis on the vibration detected by the sensor; and
an anomaly determination unit configured to perform anomaly determination on the reduction drive based on a result of the statistical analysis and a result of the frequency analysis,
wherein
the housing of the reduction drive has a substantially box shape,
the sensor comprises a plurality of sensors, each of the sensors being attached, near a corner of the housing, onto a corresponding one of three faces defining the corner, and
acceleration in three-axis directions near the corner of the housing is measured using each of the sensors.

2. The anomaly detection system according to claim 1, wherein
the statistical analysis unit performs the statistical analysis using acceleration of the vibration detected by the sensor, and
the anomaly determination unit determines presence or absence of an anomaly in the reduction drive based on a result of the statistical analysis.

3. The anomaly detection system according to claim 1, wherein
the statistical analysis unit obtains a frequency distribution of a magnitude of acceleration of the vibration detected by the sensor, and
the anomaly determination unit determines presence or absence of an anomaly in the reduction drive based on a variance of the frequency distribution obtained.

4. The anomaly detection system according to claim 1, wherein
the frequency analysis unit generates a power spectrum indicating a magnitude of acceleration relative to a frequency of the vibration detected by the sensor, and
the anomaly determination unit identifies a type of an anomaly in the reduction drive based on the power spectrum.

5. The anomaly detection system according to claim 1, wherein
anomaly determination data associating a power spectrum indicating an anomaly with a type of an anomaly in the reduction drive is previously stored in the anomaly determination unit, and
the anomaly determination unit determines the type of the anomaly in the reduction drive by checking the power spectrum generated by the frequency analysis unit against the anomaly determination data previously stored.

6. The anomaly detection system according to claim 1, wherein
the anomaly determination unit determines an anomaly location in the reduction drive based on results of the statistical analysis and results of the frequency analysis on the plurality of sensors.

7. The anomaly detection system according to claim 1, wherein each of the sensors is attached to at least one of an upper side of a face of the reduction drive on which an input shaft is provided and an upper side of a face of the reduction drive on which an output shaft is provided.

8. An anomaly detection method for detecting an anomaly in a reduction drive, the method comprising the steps of:
performing a statistical analysis on vibration on a surface of a housing of the reduction drive using a sensor attached to the housing of the reduction drive;
performing a frequency analysis on the vibration detected by the sensor; and performing anomaly determination on the reduction drive based on a result of the statistical analysis and a result of the frequency analysis,
wherein
the housing of the reduction drive has a substantially box shape,
the sensor comprises a plurality of sensors, each of the sensors being attached, near a corner of the housing, onto a corresponding one of three faces defining the corner, and
acceleration in three-axis directions near the corner of the housing is measured using each of the sensors.

* * * * *